(12) United States Patent
Herget et al.

(10) Patent No.: US 11,338,576 B2
(45) Date of Patent: May 24, 2022

(54) MOBILE ROBOT PRINTING WITH WIND PROTECTION

(71) Applicant: Dusty Robotics, Inc., Mountain View, CA (US)

(72) Inventors: Philipp Josef Herget, Sunnyvale, CA (US); Jeogseop Lee, Mountain View, CA (US)

(73) Assignee: DUSTY ROBOTICS, INC., Mountain View, CA (US)

( * ) Notice: Subject to any disclaimer, the term of this patent is extended or adjusted under 35 U.S.C. 154(b) by 0 days.

(21) Appl. No.: 17/019,241

(22) Filed: Sep. 12, 2020

(65) Prior Publication Data

US 2021/0078319 A1 Mar. 18, 2021

Related U.S. Application Data

(60) Provisional application No. 62/900,278, filed on Sep. 13, 2019.

(51) Int. Cl.
*B41J 2/045* (2006.01)

(52) U.S. Cl.
CPC ......... *B41J 2/04526* (2013.01); *B41J 2/0458* (2013.01); *B41J 2/04581* (2013.01)

(58) Field of Classification Search
CPC .. B41J 2/04526; B41J 2/0458; B41J 2/04581; B41J 3/407; B41J 2/01
See application file for complete search history.

(56) References Cited

U.S. PATENT DOCUMENTS

| | | | |
|---|---|---|---|
| 5,467,273 A | 11/1995 | Faibish et al. | |
| 6,954,635 B2 | 10/2005 | Kim et al. | |
| 7,806,493 B2 | 10/2010 | Gazeau et al. | |
| 8,417,383 B2 | 4/2013 | Ozick et al. | |
| 9,800,757 B2 | 10/2017 | Fujimoto et al. | |
| 10,268,202 B1 | 4/2019 | Casale et al. | |
| 2003/0041098 A1* | 2/2003 | Lortz ..................... | G06Q 10/06 709/203 |
| 2003/0117652 A1* | 6/2003 | Lapstun .............. | G06F 3/03545 358/1.18 |
| 2004/0210319 A1 | 10/2004 | Lapstun et al. | |

(Continued)

FOREIGN PATENT DOCUMENTS

WO 2015066461 A1 5/2015

OTHER PUBLICATIONS

Pierlot et al., "BeAMS: a Beacon based Angle Measurement Sensor for Mobile Robot Positioning," IEEE Transactions on Robotics, 30(3):1533-549, Jun. 2014, 17 pgs. https://orbi.uliege.be/bitstream/2268/153647/1/Pieriot2014BeAMS.pdf.

(Continued)

*Primary Examiner* — Shelby L Fidler
(74) *Attorney, Agent, or Firm* — Patent Law Works LLP (57) ABSTRACT

A mobile printing robot includes a windbreak to reduce wind-induced deflection of ink droplets emitted from a printhead of the mobile printing robot. The printhead may have a comparatively large throw height to aid in permitting obstacles, such as particles from safely passing under the printhead without damaging the printhead or cause the printhead to become stuck. The windbreak may be implemented using resiliently compliant sections that block the wind but accommodate the passage of particles or other obstacles.

29 Claims, 10 Drawing Sheets

(56) References Cited

U.S. PATENT DOCUMENTS

| | | |
|---|---|---|
| 2007/0100496 A1 | 5/2007 | Forell |
| 2010/0143089 A1 | 6/2010 | Hvass et al. |
| 2010/0215216 A1 | 8/2010 | Hong et al. |
| 2012/0200626 A1 | 8/2012 | Orr |
| 2015/0377605 A1 | 12/2015 | Bridges |
| 2017/0131398 A1 | 5/2017 | Younis |
| 2018/0107969 A1 | 4/2018 | Trivelpiece et al. |
| 2018/0216941 A1 | 8/2018 | Zhu et al. |
| 2018/0361585 A1 | 12/2018 | Williams et al. |
| 2019/0196492 A1 | 6/2019 | Casale et al. |
| 2019/0240912 A1 | 8/2019 | Alves |
| 2019/0381529 A1 | 12/2019 | Schaumberger |

OTHER PUBLICATIONS

International Search Report and Written Opinion, dated Nov. 4, 2020, for PCT/US2020/045994, International Filing Date Aug. 12, 2020, 14 pgs.

International Search Report and Written Opinion for PCT/US2020/050594, dated Dec. 8, 2020, 10 pgs.

International Preliminary Report on Patentability fo PCT/US2020/045994, dated Feb. 24, 2022, 9 pgs.

International Preliminary Report on Patentability for PCT/US2020/029592, filed Apr. 23, 2020, dated Nov. 4, 2021.

\* cited by examiner

Rigid wind shield
with semi-flexible
or hinged joint

Figure 7A

Bristle type wind shield

MOBILE ROBOT PRINTING WITH WIND PROTECTION

CROSS-REFERENCE TO RELATED APPLICATIONS

This application claims priority to U.S. Provisional Application Ser. No. 62/900,278, filed Sep. 13, 2019, titled "Robotic Printing System With Wind Protection", which is hereby incorporated herein in its entirety by this reference.

FIELD OF THE INVENTION

The present disclosure is related to mobile robot technology. More particularly, the present disclosure is related to mobile robots that can implement markings on a horizontal surface.

BACKGROUND

Mobile robots can be used for a variety of applications. One environment in which mobile robots could be used is spaces such as a construction jobsite, where a mobile robot could perform a variety of functions in the environment. One such application is the printing of drawings, text, or other markings on a surface such as the concrete floor of a building under construction.

One of the challenges to building such a mobile printing robot is the precision at which the robot must deliver the markings. In the construction application, precision of less than 1/16" (1.6 mm) is generally required. Mobile robot positioning is generally not this precise. The commonly-accepted algorithm for determining a robot's position ("localization") inside a space uses sensor readings (typically LiDAR) of the robot's distance from known landmarks such as walls. However, even top-of-the-line LiDAR units only report distance to within centimeter (cm) accuracy, limiting a robot's ability to determine its own position precisely.

The current practice of construction layout is to hire human crews to lay out building components, such as walls, ducting, and wiring, by physically marking the flooring surface. Locations are referenced off of plans generated by an architect, and delivered to the jobsite typically in large rolls of blueprints or in digital form on tablet computers. The typical layout process comprises using measuring tape to measure out distances from known landmarks such as concrete pillars or control points inscribed in the concrete by surveyors, and tensioning chalk-covered string between two pins to mark straight lines. An alternative to using measuring tape to locate lines is the use of total stations to accurately place the line endpoints to within a tolerance of up to 1-2 mm of the desired location. This can improve both the speed and accuracy of the layout process.

Some of the problems with using mobile robots to print a layout include a variety of practical problems associated with operating a mobile robot in a construction environment. For example, the environmental conditions on a construction site can vary over a wide range.

SUMMARY

The present disclosure relates to systems and methods for providing a windbreak to prevent wind-induced deflection of ink droplets of a mobile print robot.

An exemplary mobile printing robot includes a drive system, a control system, and a print system having a print head configured to emit ink droplets under the direction of the control system to print a layout on a horizontal construction surface. The mobile robot also has a windbreak to mitigate wind-induced deflection of the ink droplets along at least a portion of the trajectory from the print head to the horizontal construction surface. The windbreak is resiliently conformable to adapt to surface obstacles and surface irregularities associated with the horizontal construction surface.

It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

The present disclosure describes systems and method for using a windbreak to aid a mobile robot to move around in an environment and make markings at specific locations. As used in this application, a windbreak is a structure that reduces wind-induced deflection of a printing medium (e.g., ink droplets) by external wind. A windbreak is thus a broader term than a windshield, although a windbreak may include a windshield, or windshield sections. However, a windbreak does not have to be a solid or contiguous shield but may have gaps, holes, slits, cutouts, etc. A windbreak may also include composite sections, such as having a sequence of wind blocking sections. A windbreak may mitigate the effect of wind on printing operations by reducing the velocity of wind along a substantial portion of the trajectory of ink droplets. While a windbreak may be designed to create a wind still region, a reduction in wind velocity may be sufficient in some cases. A windbreak may also be formed from resiliently flexible materials or have features to permit the windbreak to bend, hinge, or flex.

Figure 1:
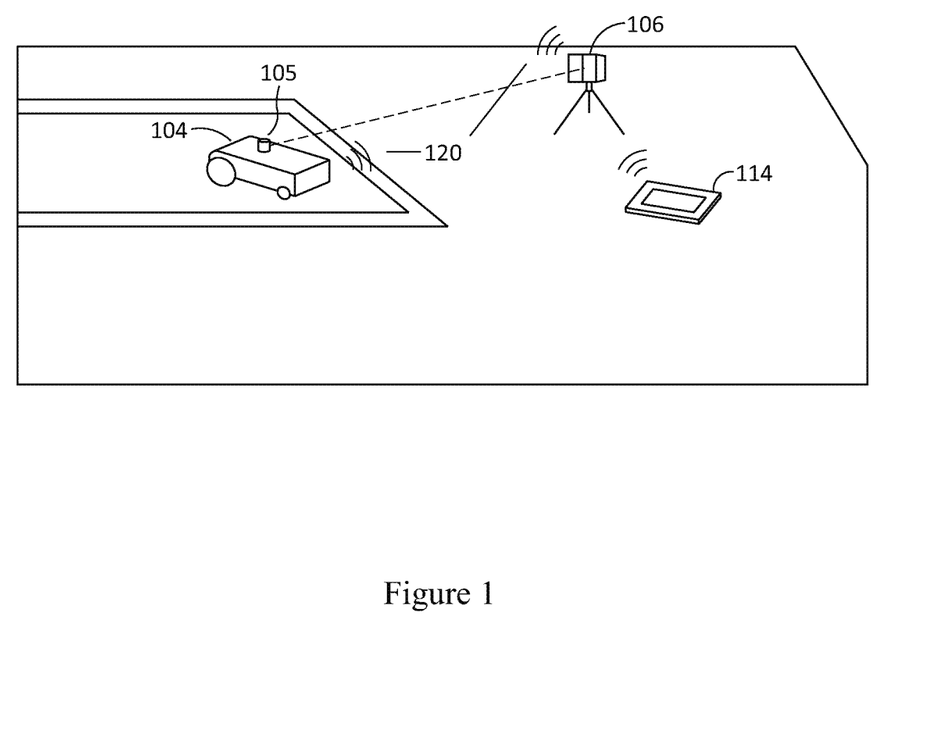
FIG. 1 is a diagram illustrating a mobile printing robot system in accordance with an implementation.

Referring to the example of FIG. 1, a mobile printing robot 104 could autonomously navigate on a concrete surface and print a building layout on the floor corresponding to an architect's plans for how a building is to be constructed. Correct, accurate layout is of utmost importance to a construction project. Layout that is incorrectly drawn may result in costly rework, for example, if a wall is constructed in the wrong place and must be demolished and reconstructed. Incorrect layout may also result in code violations, such as failing to place a toilet at a specified distance from the wall per local building code.

Wind in the environment around a mobile printing robot can cause a deflection in the trajectory of the printing medium (e.g., ink droplets for ink jet printing) reducing layout accuracy in some cases. If the wind is strong enough, then accurate printing within a required tolerance may not be possible, which would result in printing operations having to be halted until environment conditions change. Similarly, a strong wind may prevent printing all together. The small ink droplets ejected from a print head rapidly decelerate as they travel through the air. If the path length is too long, the droplet velocity goes to zero (or near zero) before hitting the surface and the image is never formed. Strong winds increase the path length by deflecting ink sideways and can result in the media never reaching the surface. Thus, the inclusion of a windbreak on a mobile robot can improve printing accuracy and/or support operating the mobile printing robot over a wider range of wind conditions.

An example of a general mobile printing system is illustrated in FIG. 1. As shown in FIG. 1, one implementation of the system 100 comprises a mobile robot 104, one or more absolute positioning devices (APD) 106, and an optional portable device containing a user interface 114, such as a tablet. The APD measures the robot's location by using a laser, to detect the location of a reflector, prism, or similar retroreflective device 105, which can be temporarily affixed to the robot 104. The laser is shown as a dotted line in the figure. The measured location is communicated to the robot via a wireless link, 120. This link may use an existing network such as WiFi, or alternatively it may happen though a direct communication channel using a radio or optical connection between the APD 106 and the robot 104.

Figure 2:
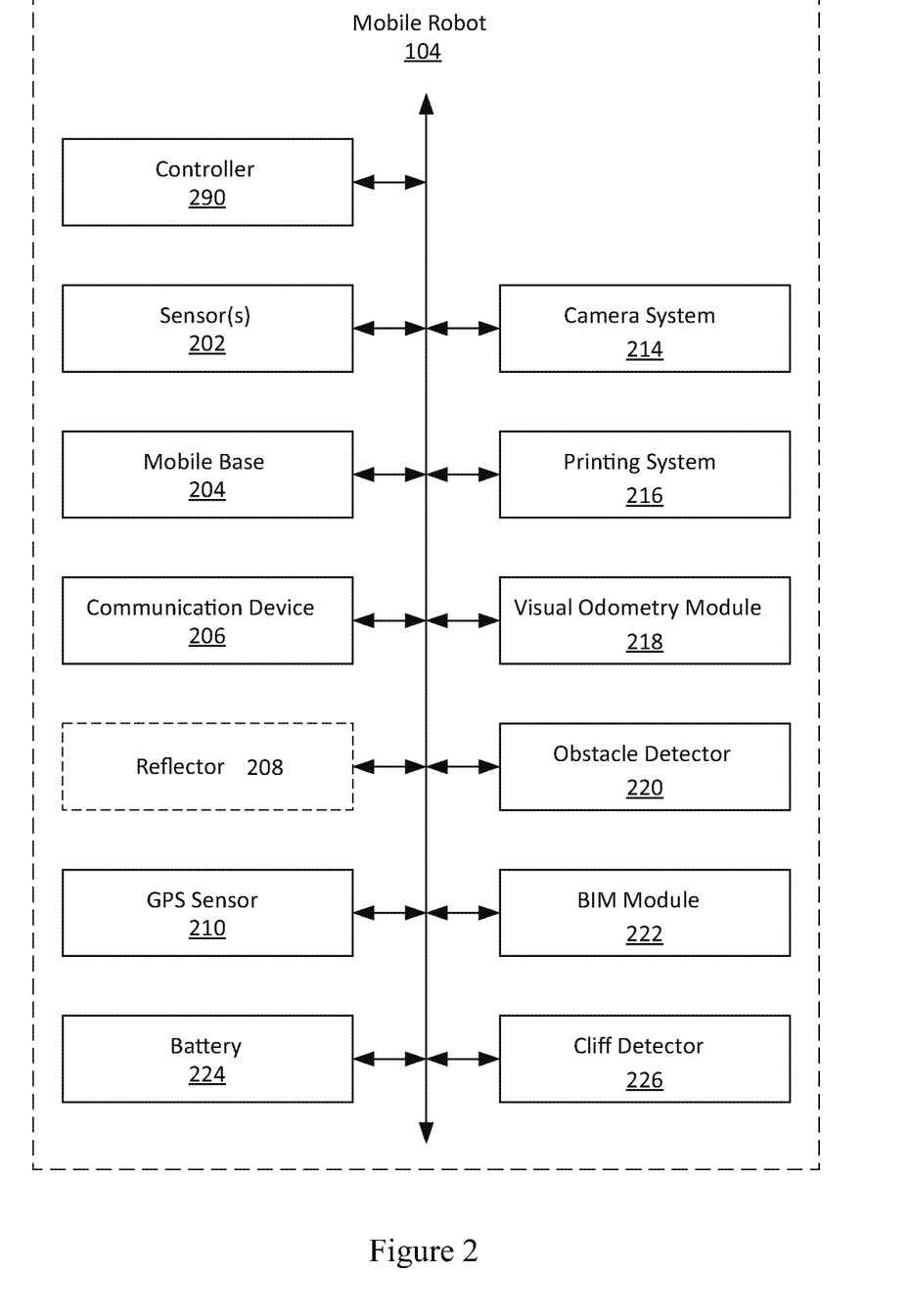
FIG. 2 is a block diagram of major components of a mobile robot in accordance with an implementation.

As shown in the example of FIG. 2, one implementation of the mobile robot 104 comprises a controller 290, one or more sensors 202, one of which may be an IMU, accelerometer, gyroscope, or compass, a mobile base 204, a communication device 206 a reflector 208, a GPS sensor 201, a camera system 214, a printing system 216, a visual odometry module 218, an obstacle detector 220, a Building Information Model (BIM) module 222 having information about a building layout to be printed, a battery 224 and a cliff detector 226.

The printing system 216 may include a print head, such as an ink jet printing head. The printing system is controlled by the controller 290 to print a layout on a construction surface.

Figure 3:
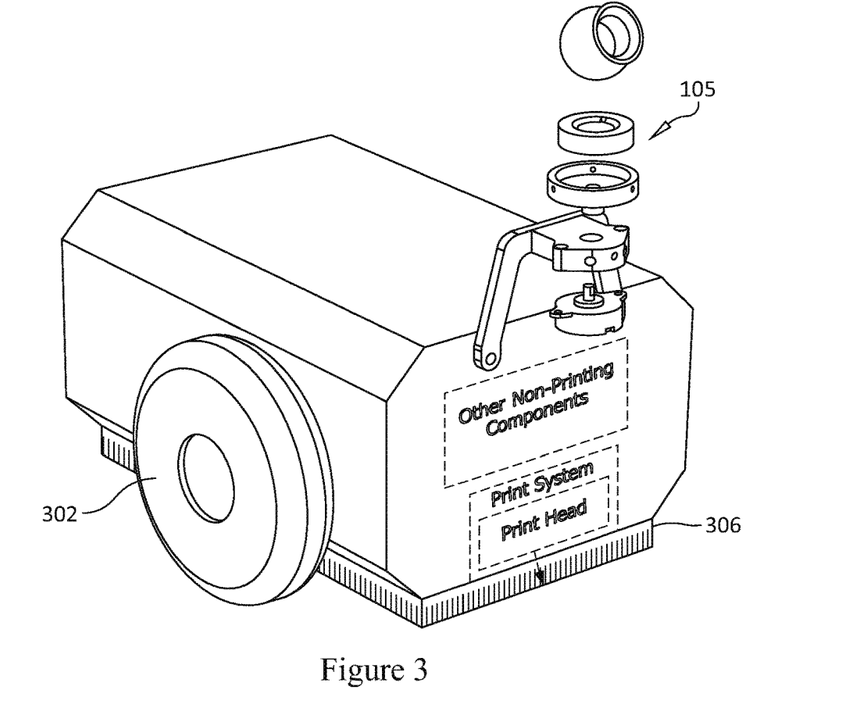
FIG. 3 is a perspective diagram of a mobile printing robot with a windbreak in accordance with an implementation.

In the example of FIG. 3, a mobile printing robot is illustrated that is equipped with a set of drive wheels, a control system (illustrated in phantom), a means for accurately measuring the robot's location (e.g., using a retroreflective device), a print system (illustrated in phantom) having a print head (illustrated in phantom), and a mechanical windbreak 306, designed to reduce the air currents in the vicinity of the ink droplets (illustrated by the dashed arrow) emitted by the print head.

The windbreak 306 may be permanently attached to the mobile robot. However, more generally it may be detachable attached, e.g., be added as an option for operating a mobile printing robot in windy conditions, and/or replaced as necessary. Additionally, in some implementations, actuators or other translation mechanism may be provided to raise or lower the windbreak 306 as necessary to clear obstacles, debris or surface steps in height.

The robot may include a set of drive wheels 302 and a caster (not shown) that sets the ground clearance of the robot. In this example, the windbreak, 306 is located around the perimeter of the robot. This windbreak is designed with 3 purposes in mind: 1) The windbreak blocks (or substantially reduces) the wind in the environment from disturbing the path of the ink being jetted from the print head under the robot; 2) The windbreak is designed to be flexible to allow larger pieces of debris to pass under the robot and adapt to surface irregularities, such as change in surface height; and 3) The windbreak is designed in a way to prevent the creation of dust in the air around the print head. This is typically done by having a small clearance between the windbreak and the ground.

In the example of FIG. 3, the windbreak 306 is illustrated as being located about the bottom periphery of the robot. It thus breaks the force of the wind and helps prevent deflection of the trajectory of the ink droplets emitted from the print head. The windbreak can be implemented to be resiliently compliant. For example, it may be formed from bristles that are resiliently compliant. It may also be formed from one or more sections or pieces that are resiliently compliant. It may also include solid windshield sections. For example, it may be formed from bendable materials, such as certain types of rubbers, plastics, and polymers. It may be formed from solid pieces mounted by spring-like sections to bend or hinge.

As previously discussed, the windbreak does not necessarily have to be free of slots, holes, or gaps. Indeed, there may be an intentional gap between the bottom of the windbreak 306 and the construction surface. Also discussed below in more detail, slots, holes, gaps, or cutouts may be intentionally included for various purposes, such as to permit the passage of particles.

The windbreak 306 may be designed to be made of a flexible material such as rubber or thin plastic. Furthermore, the plastic or rubber windbreak may contain cuts such that a small rock passing through the windbreak would have a minimal disturbance to the protective barrier of the windbreak 306. Likewise, the windbreak 306 may be made of bristles, porous materials, or a similar material that is flexible. As other examples, the windbreak may also be constructed out of rigid materials (e.g., rigid plates, such as rigid metal plates) with semi-rigid joints or hinges that permit the rigid portion to fold to help clear obstacles and debris. For example, a rigid plate may have increased robustness against the elements and abrasive force in the environment.

In a typical construction site, there are work rules limiting the environmental conditions under which work open to the elements may be performed. In the United States, there are OSHA guidelines that construction work should not be continued by labor crews for windspeeds greater than 40 MPH and 30 MPH for material handlers. The windbreak does not have to block all wind. Rather, reducing the wind velocity along the trajectory of ink jet droplets reduces the ink droplet deflection. Thus, the windbreak permits the mobile robot to operate over a wider range of wind speeds for a given maximum deflection. For example, in some application, a maximum wind-induced deflection of the ink droplet of 2 mm may be sufficient to have a satisfactory layout accuracy. In some implementation, the windbreak is designed to permit the mobile robot to print a layout under a maximum permissible windspeed for people to work at a construction site (e.g., the OSHA 30 MPH/40 MPH limits).

As an example, a mobile robot that has a retroreflector and is configured to receive position information from an absolute positioning device (APD) that uses a laser beam to measure a position of the mobile robot may permit control of the position of the mobile robot to accurately controlled to a precious of less than 2 mm. Any wind-induced deflection of ink droplets that is beyond a line position tolerance (e.g., 2 mm) would be unacceptable in some layout applications. Thus in some implementations, a mobile robot having a positional accurately controlled to less than 2 mm by an APD can operate over a range of windspeeds for which the wind-induced deflection is also less than 2 mm. For example, the windbreak may be designed to support a wind induced deflection of less than 2 mm for a windspeed of at least 30 MPH.

Furthermore, the wind break may not reduce the windspeed equally along the entire ink trajectory. In many of the designs presented, the wind speed and turbulence is reduced to a much greater degree near the print head and to a lesser degree near the ground. This causes the ink droplets to fly straight for the majority of the trajectory, and reduces the size of the deflection. A small amount of deflection at the top of the trajectory will cause a much larger error than the same deflection at the end.

The benefit of using a windbreak is significant for a variety of ink jet printing technologies. One of the challenges in marking a layout onto the ground is printing accurately. There are a number of commercial printing technologies available that jet ink over a maximum distance of ¼ inch and up to 1 inch. These inkjet technologies also vary greatly in the drop size and dots per inch (DPI) they can achieve. Higher DPI printers pack a higher density of small drops into a small area. In commercial printing systems, these high DPI heads are typically located extremely close to the surface being printed (typically paper) to minimize the disturbances caused by environmental conditions.

At a commercial construction site however, it is desirable to keep the print head far away from the print surface to protect it from dust and debris that typically present. For example, nails, bolts, or other construction debris may exist on a construction site. For example, in many construction sites there may be debris up to 6 mm or ¼ inch in diameter. The debris may include particles, bolts, screws, nails, etc.

Additionally, a construction surface may have surface irregularities. For example, step heights of up to about 6 mm or ¼ inch may exist at some construction sites in which flooring panels attached to support structures are not at exactly the same height.

That is, to account for surface obstacles and surface irregularities, a long throw distance is desirable to minimize the chance that the print head will be damaged or become stuck when the mobile robot passes over an obstacle or surface irregularity. The throw distance is the distance between nozzle plate and the printing surface. The windbreak includes any structure below the nozzle plate that reduces the amount of wind that would be present without the structure. Different elements of the mobile robot design may contribute to the overall effectiveness of the windbreak to reduce wind-induced deflection of ink droplets.

It is thus desirable to keep the nozzles of the print head of a mobile robot used on a construction site at a height of at least about 6 mm (¼ inch) above the surface. For ink jet printing technologies, this corresponds to a much longer "throw" distance than in many conventional applications of ink jet printing to print on paper in which the printhead may be within 1 mm of the paper. While 6 mm is an exemplary throw height, somewhat slightly lower throw heights are also beneficial. This is because there is a variety of debris on a typical construction site with a distribution in debris height above the construction surface. A throw height of at least 3 mm is beneficial in regards to being above smaller types of debris. There are progressively greater benefits with increasing throw height from 3 mm to 6 mm.

Another consideration is that a high DPI is desirable to print lines of a layout. Thermal ink jet printers and piezoelectric ink jet printers can achieve a high DPI. However, the corresponding ink droplet sizes are typically in the range of 2-10 picoliters, although more generally the range is 2 to 100 picoliters. This might be contrasted with some common droplet sizes in spray painting of about 1 microliter droplet sizes.

A combination of a long throw distance and comparatively small droplet sizes means that a high dpi ink jet printhead without wind protection is highly susceptible to wind-induced deflection. Among other factors for the susceptibility to wind-induced deflection, the ink droplets have a comparatively long flight time (due to the long throw distance and slowing down due to aerodynamic drag).

Moreover, the wind-induced deflection of the ink droplets is often unpredictable. Buildings often need layout before the ceiling and walls have been erected, exposing the floor to be laid out to full outdoor environmental conditions. The droplet sizes, which can be as small as 2-10 picoliters, can be easily shifted by air currents in an unpredictable manner.

Figure 4:
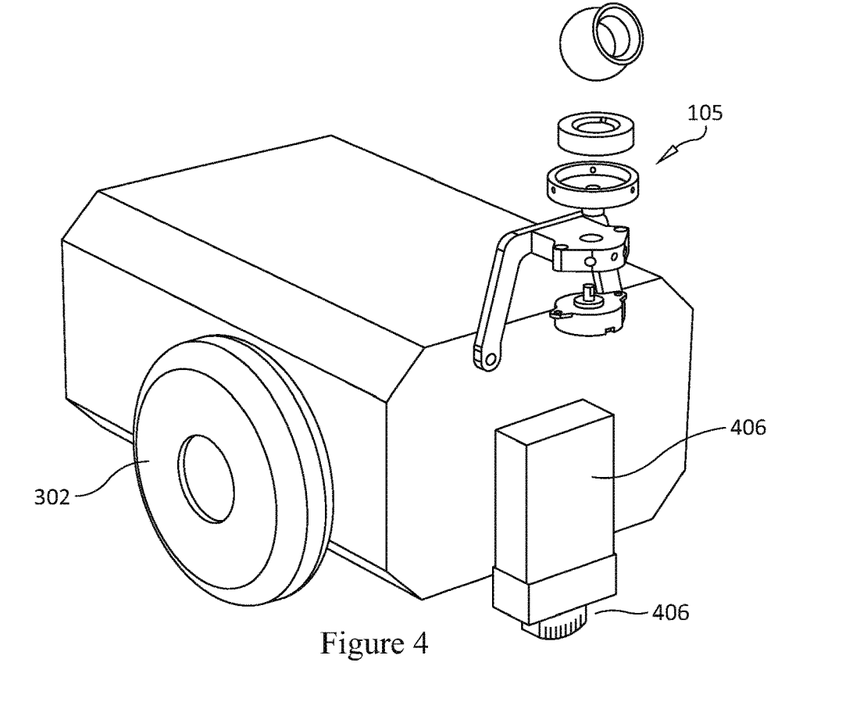
FIG. 4 is a perspective diagram of a mobile printing robot with a windbreak in accordance with an implementation.

FIG. 4 shows another example of a mobile printing robot with a windbreak. The figure shows the same robot having a set of drive wheels 302 and a caster (not shown) that sets the ground clearance of the robot. Also shown is the printer, 404 which is mounted near the edge of the robot. In this example, a smaller windbreak, 406 is located locally, surrounding the active portion of the print head. This creates a wind still cavity around the active area of the printer.

Designing a windbreak having a small cavity has some advantages over creating a shield around the edge of the robot. The deflection of the ink is caused by the cumulative effects of the wind forces over the trajectory of the ink droplets over the distance they travel down to the ground. Creating a narrow windbreak limits wind to only the lowest portion of the ink's travel distance, minimizing the deflection created.

Figure 5A:
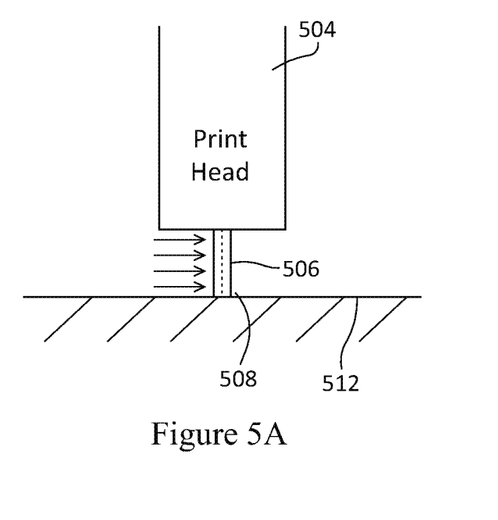
FIGS. 5A and 5B illustrate a cross-sectional view of resiliently conformable windbreak in accordance with an implementation.

FIG. 5A illustrates an additional aspect of operation of a mobile robot with a windbreak. The print head 504 has a windbreak 506 that forms a narrow, wind-still cavity over a large portion of the travel distance of the ink. Wind directed from the side of the print head will only affect the lowest portion of the ink travel. At the bottom, there is a gap 508 between the windbreak and the ground that prevents the shield from striking the ground and kicking up dust.

Figure 5B:
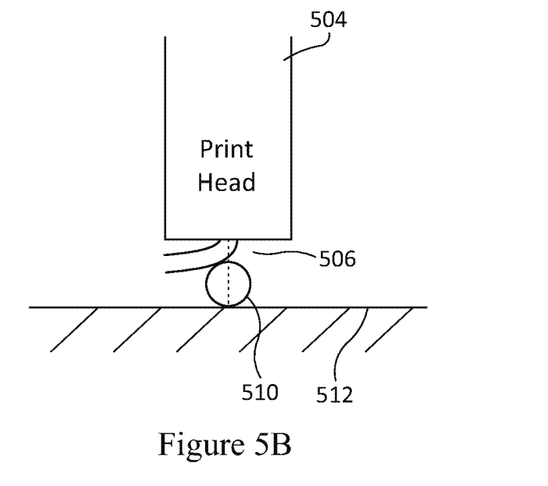

FIG. 5B illustrates the function of the windbreak when the mobile printing robot passes over a small piece of debris 510 such as a rock, piece of concrete, nail, screw, bolt, etc. that is laying on the ground 512. Here the windbreak provides another benefit. The windbreak may be formed from a flexible rubber material that bends under the pressure of the object. This allows the object to pass under the head, but at the same time, the windbreak may be designed to fold over and protect the sensitive nozzles in the print head. That is, the windbreak, which may be implemented as two or more resiliently comfortable windshield sections, may be designed to bend and fold in a manner to protect the sensitive portions of the printhead when the mobile robot passes over an obstacle.

Figure 6A:
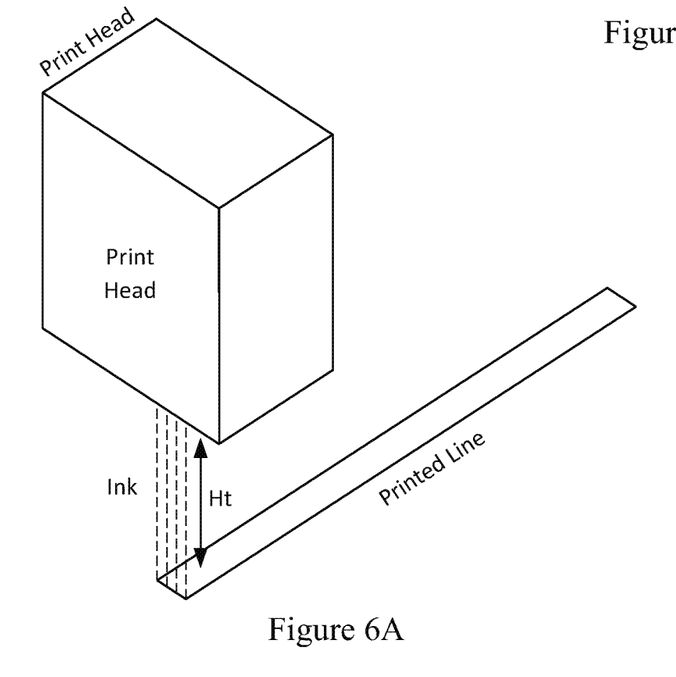
FIG. 6A illustrates a printhead portion of a mobile robot printing a line on a construction surface without a windbreak in accordance with an implementation.
Figure 6B:
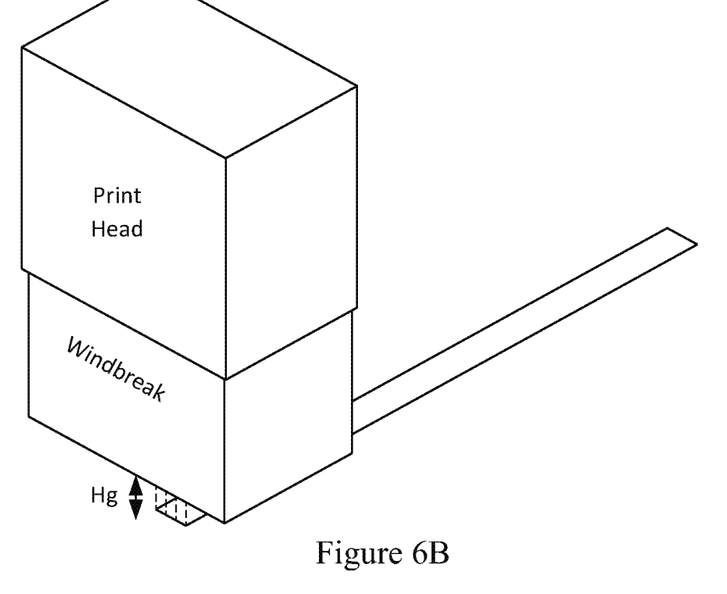
FIG. 6B illustrates a printhead portion of a mobile robot with an additional windbreak in accordance with an implementation.
Figure 6C:
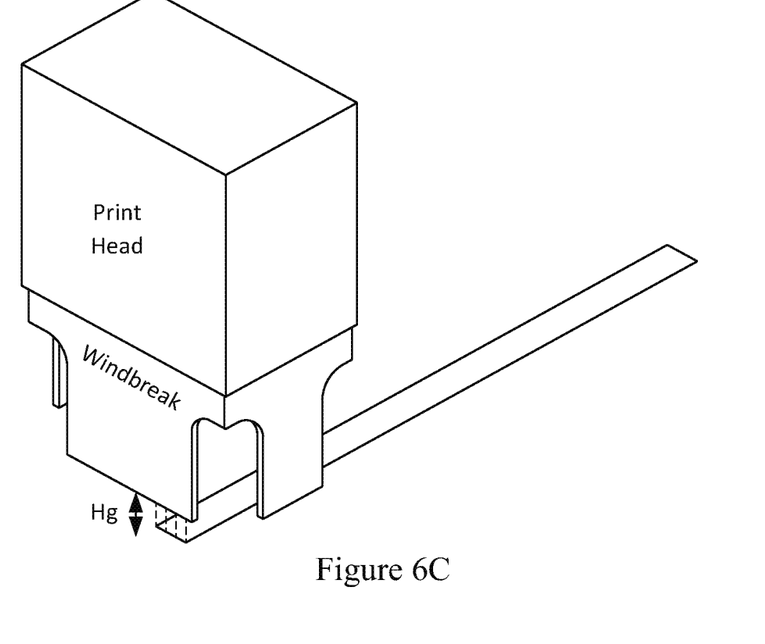
FIG. 6C illustrates a printhead portion of a mobile robot with a windbreak having cutout sections in accordance with an implementation.

FIG. 6A shows, for the purposes of illustration, the print head of the mobile printing robot, the droplets of ink traveling toward the construction surface, and the printed line. The print head is disposed above the surface by a throw height, Ht. However, with no wind protection, the ink droplets are susceptible to wind-induced deflection. This has the potential to reduce the printed line quality. FIG. 6B illustrates an example in which a windbreak is provided that protects the ink droplet from being deflected by wind. In the example of FIG. 6B, the windbreak is formed as a windshield around a substantial portion of the trajectory of the ink droplets with only a small gap Hg for clearance near the construction surface. FIG. 6C illustrates a variation in which there are cutouts in the windbreak to facilitate the windbreak bending and folding over obstacles. In particular, the cutouts make it easier for debris such as nuts, bolts, screws, nails, and particles to pass through. The cutouts may also be used to form flaps that are resiliently biased.

Figure 7A:
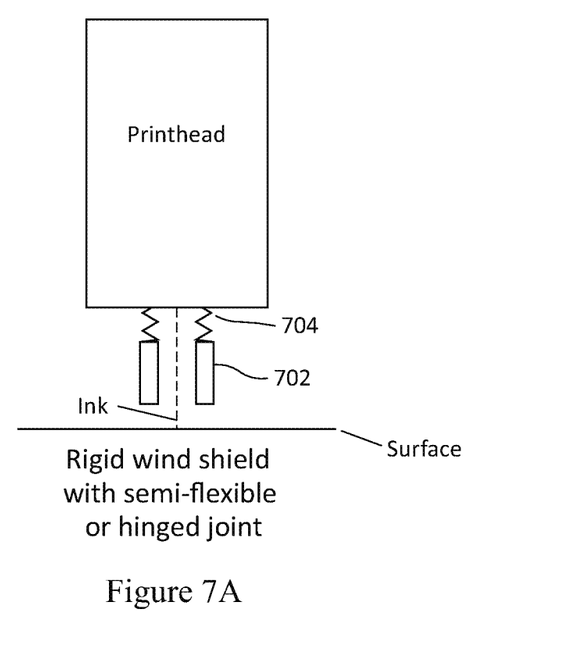
FIG. 7A illustrates cross-sectional view of an example of a windbreak for a printhead having rigid wind shield sections and flexible or hinged joints in accordance with an implementation.
Figure 7B:
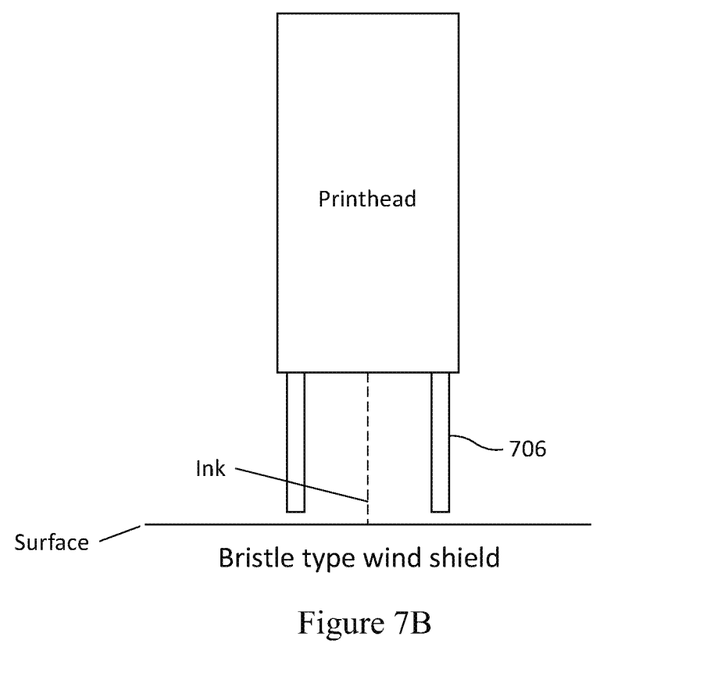
FIG. 7B illustrates cross-sectional view of a windbreak with bristle-type windbreak in accordance with an implementation.
Figure 7C:
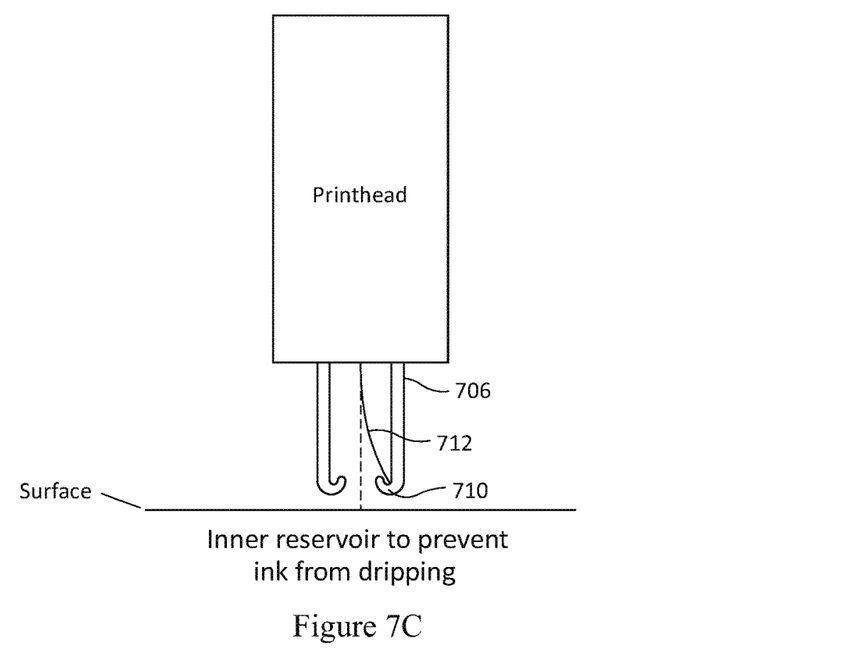
FIG. 7C illustrates cross-sectional view of a windbreak with windbreak sections shaped from an inner reservoir to prevent ink from dripping in accordance with an implementation.
Figure 7D:
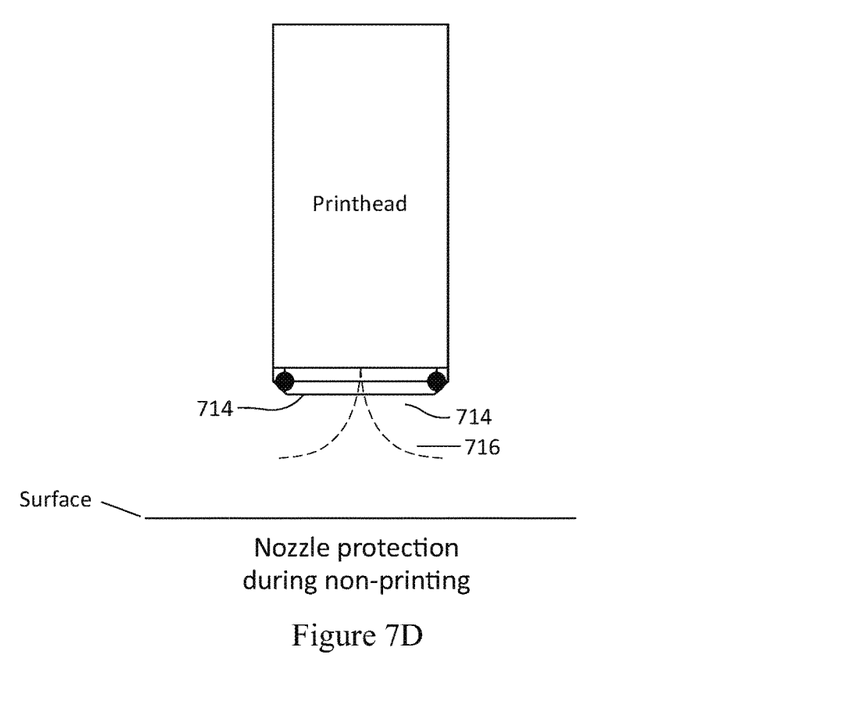
FIG. 7D illustrates cross-sectional view of a windbreak in which the windbreak sections optionally fold in to protect a printhead nozzle in accordance with an implementation.
Figure 7E:
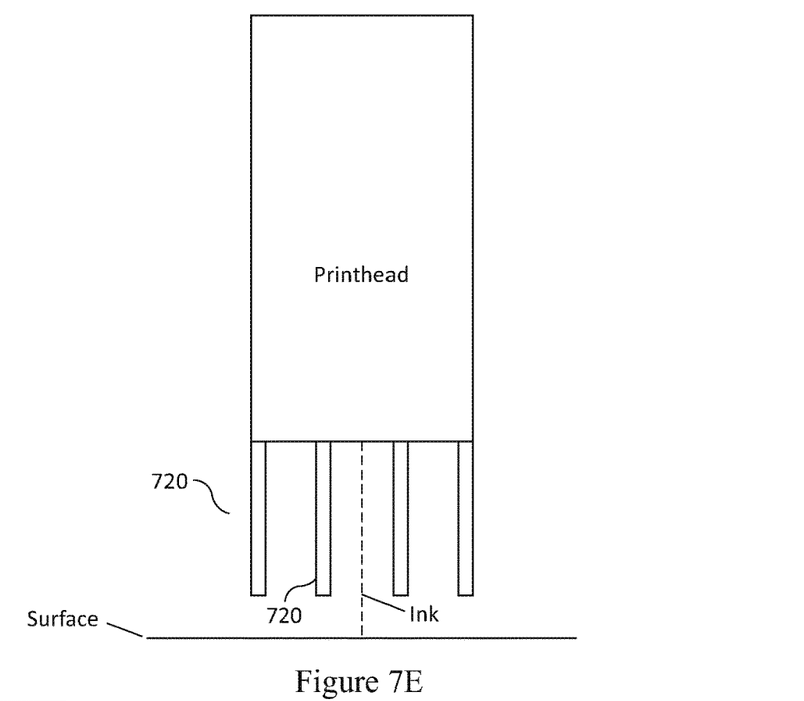
FIG. 7E illustrates cross-sectional view of a windbreak with multiple nested windbreak sections in accordance with an implementation.
Figure 7F:
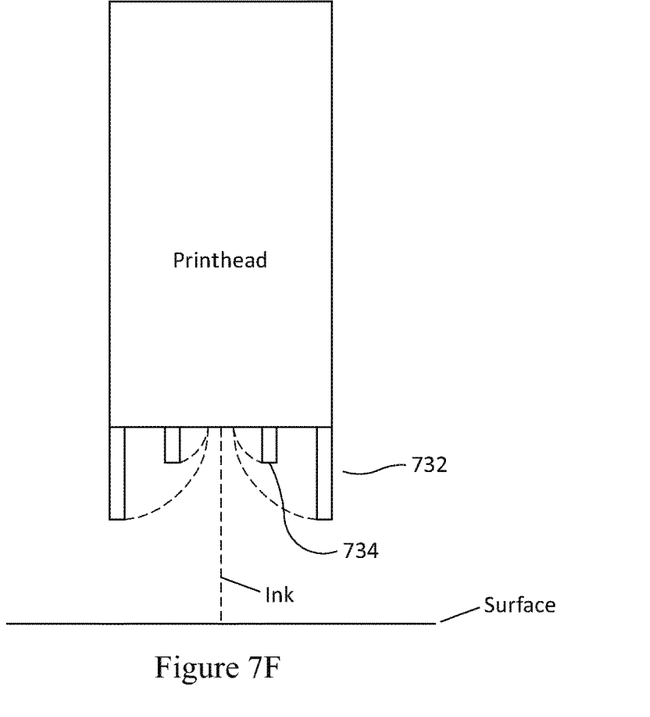
FIG. 7F illustrates cross-sectional view of a windbreak with multiple nested windbreak sections that optionally folds in to protect the printhead in accordance with an implementation.

FIGS. 7A to 7F illustrate some variations in windbreak design using a variety of different design elements. For the purposes of illustration, the printhead and the windbreak are illustrated. FIG. 7A illustrates an example of a printhead emitting ink droplets (dashed line) with rigid windbreak sections 702 attached by semi-flexible or hinged joints 704 that are biased to permit the rigid sections to swing over debris. FIG. 7B illustrates a bristle-type windbreak with the windbreak implemented by one or more rows of bristles 706, where the bristle thickness and material is chosen for the bristles to be resiliently conformable. FIG. 7C illustrates an example in which the windbreak 708 is shaped to have reservoir sections 710 to catch stray ink droplets 712 and prevent them from dripping. FIG. 7D illustrates an example in which the windbreak sections 714 are shaped to fold 716 over the ink jet nozzles as a nozzle cap when the mobile robot is not printing. For example, some types of ink jet cartridges are more susceptible to nozzle clogging when exposed to the environment for a long time. The folding can be performed manually or by electromechanical actuators (not shown). For example, clogging may be more a problem in dry environments with high temperatures. Using the windbreak barrier to serve as a nozzle cap may be useful, for example, during non-printing events such as robot navigation. FIG. 7E illustrates an example in which the windbreak has multiple sections 720, which may be arranged to form a multi-section windbreak, such as a windbreak having inner and outer windshield sections. FIG. 7F illustrates an example of a windbreak with multiple sections 732 and 734 that further may be designed with a limited length to ensure the nozzles remain unblocked when they are folded to guarantee continuous operation.

Figure 8A:
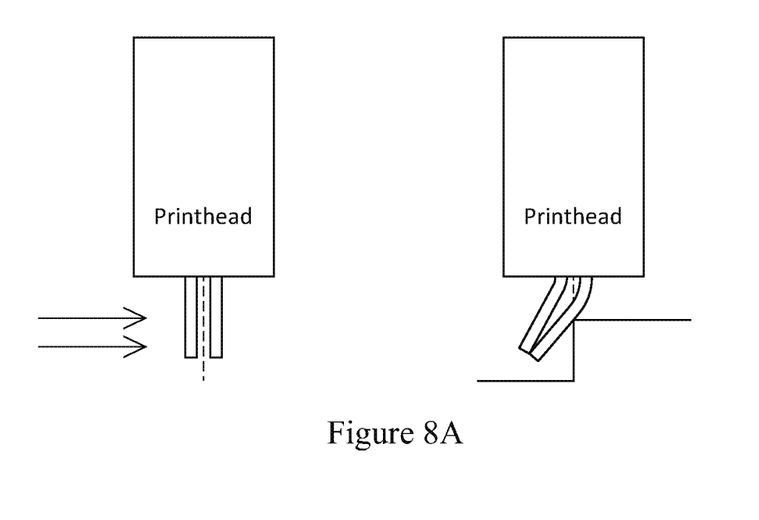
FIG. 8A illustrates cross-sectional view showing how a resiliently conformable windbreak adapts to surface irregularity in surface height in accordance with an implementation.
Figure 8B:
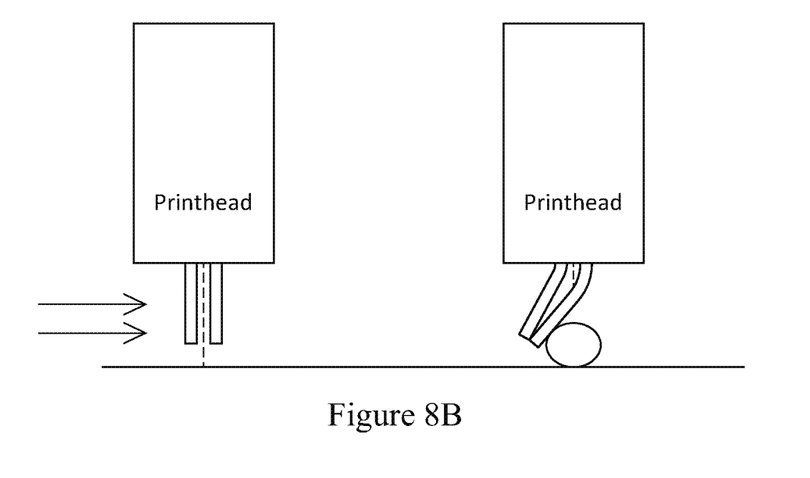
FIG. 8B illustrates cross-sectional view show a resiliently conformable windbreak adapts to surface debris in accordance with an implementation.

FIG. 8A illustrates an example of how a resiliently conformable windbreak may adapt to a surface irregularity, such as a change in surface height. FIG. 8B illustrates an example of how a resiliently conformable windbreak may adapt to encountering a particle.

Figure 9:
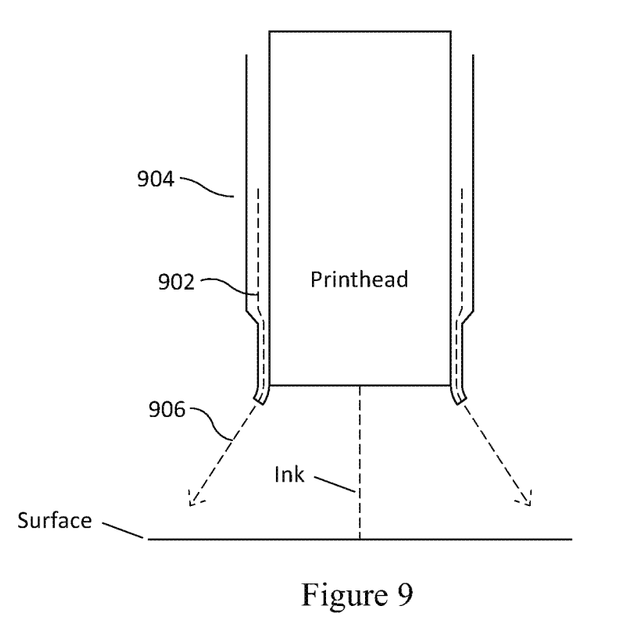
FIG. 9 illustrates cross-sectional view of an embodiment in which an air curtain blocks wind from the environment in accordance with an implementation.

FIG. 9 illustrates an alternate embodiment in which an air curtain is generated by a flow of air 902 channeled by the side sections 904 of the printhead. That is, the windbreak is a laminar flow of air forming an air curtain 906.

The source of the air itself may come from a source of air on the mobile robot (e.g., a fan or compressor). The air curtain is a laminar flow of air around the path of the ink (dashed line). That is, the laminar flow of air blocks the wind without requiring a physical barrier to block the wind. The laminar flow of air may also be used to clear out debris and dust to prepare the ground for printing or to help keep the ink jet nozzles clean. While an air curtain may be used as the sole means to prevent wind-induced deflection of ink, more generally it may be used in conjunction with a mechanical windbreak.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes, but is not limited to, firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A mobile printing robot, comprising:
   a drive system;
   a control system;
   a print system having a print head configured to emit ink droplets under the direction of the control system to print on a horizontal construction surface; and
   a windbreak to mitigate wind-induced deflection of the ink droplets along at least a portion of the trajectory from the print head to the horizontal construction surface;
   wherein the windbreak is resiliently conformable to adapt to surface debris and surface irregularities associated with the horizontal construction surface.

2. The mobile printing robot of claim 1, wherein the print head emits ink droplets in a droplet size range of 2 picoliters to 100 picoliters.

3. The mobile printing robot of claim 1, wherein the print head is configured to print with a ink droplet throw distance to the horizontal construction surface selected to account for a range of surface debris sizes on the construction surface of at least 3 mm.

4. The mobile printing robot of claim 3, wherein mobile robot has a retroreflector and is configured to receive position information from an absolute positioning device (APD) that uses a laser beam to measure a position of the mobile robot and a position of the mobile robot while printing lines of a layout is controlled to within 2 mm.

5. The mobile printing robot of claim 3, wherein the windbreak reduces the wind-induced deflection of ink droplets to less than 2 mm up to a wind speed of at least 30 MPH.

6. The mobile printing robot of claim 3, wherein the debris includes mechanical particles and the windbreak is configured to bend to permit a passage of mechanical debris.

7. The mobile printing robot of claim 3, wherein the obstacles include surface irregularities in height of the construction surface, and windbreak is configured to bend to adapt to surface irregularities in height.

8. The mobile printing robot of claim 1, wherein the windbreak comprises a plurality of resilient conformable flaps.

9. The mobile printing robot of claim 1, wherein the windbreak comprises a plurality of resiliently hinged flaps.

10. The mobile printing robot of claim 1, wherein the windbreak comprises a plurality of resilient bendable bristles.

11. The mobile printing robot of claim 1, wherein the windbreak comprises a plurality of nested inner and outer windbreaking sections.

12. The mobile printing robot of claim 1, wherein at least a portion of the windbreak is removable or adjustable.

13. A mobile printing robot, comprising:
    a drive system;
    a control system;
    a print system having a thermoelectric or piezoelectric print head to emit ink droplets in a size range of 2 picoliters to 100 picoliters over a throw distance of at least 3 mm to print a layout on a horizontal construction surface; and a windbreak of the mobile printing robot being configured to mitigate wind-induced deflection of the ink droplets from the print head to the horizontal construction surface.

14. The mobile printing robot of claim 13, wherein the windbreak is configured to mitigate wind-induced deflection to be less than 2 mm for an external wind speed of up to 30 MPH.

15. The mobile printing robot of claim 13, wherein the windbreak is configured to mitigate wind-induced deflection to be less than 2 mm for an external wind speed of up to 40 MPH.

16. The mobile printing robot of claim 13, wherein the windbreak comprises a plurality of resilient conformable flaps.

17. The mobile printing robot of claim 13, wherein the windbreak comprises a plurality of resiliently hinged flaps.

18. The mobile printing robot of claim 13, wherein the windbreak comprises a plurality of bristles.

19. The mobile printing robot of claim 13, wherein the windbreak comprises a plurality of nested inner and outer windbreaking sections.

20. The mobile printing robot of claim 13, wherein at least a portion of the windbreak is removable or adjustable.

21. A mobile printing robot, comprising:
a drive system;
a control system;
a print system having a print head configured to emit ink droplets under the direction of the control system to print a layout on a horizontal construction surface; and
a windbreak to mitigate wind-induced deflection of the ink droplets reaching the horizontal construction surface to less than 2 mm over a range of wind speeds within a maximum health and safety wind speed of a construction site of no more than 40 MPH.

22. The mobile printing robot of claim 21, wherein the print head is configured to print with an ink droplet throw distance to the horizontal construction surface selected to account for a range of debris sizes on the construction surface of at least 3 mm.

23. The mobile printing robot of claim 21, wherein the windbreak comprises a plurality of resilient conformable flaps.

24. The mobile printing robot of claim 21, wherein the windbreak comprises a plurality of resilient bendable flaps.

25. The mobile printing robot of claim 21, wherein the windbreak comprises a plurality of bristles.

26. The mobile printing robot of claim 21, wherein the windbreak comprises a plurality of nested inner and outer windbreaking sections.

27. The mobile printing robot of claim 21, wherein at least a portion of the windbreak is removable or adjustable.

28. A method of printing a layout on a construction surface, comprising:
controlling a position of a mobile printing robot having a print head;
emitting ink droplets from a print head of the mobile printing robot at locations to be printed; and
mitigating wind induced deflection of the ink droplets using a windbreak comprised of resiliently conformable members.

29. The method of claim 28, wherein the mobile robot receives position information from an absolute positioning device, controls the horizontal position of the print head to within 2 mm when printing a line of a layout, and the wind induced deflection of the ink droplets is less than 2 mm up to a wind speed of at least 30 MPH.

* * * * *